United States Patent
Josse et al.

(10) Patent No.: US 6,442,159 B2
(45) Date of Patent: *Aug. 27, 2002

(54) METHOD OF ROUTING A SHORT MESSAGE AND AN APPARATUS FOR ROUTING A SHORT MESSAGE

(75) Inventors: Thierry Josse, Stockholm (SE); Miguel Cobo Esteban; Jose Javier Cabero Combarros, both of Madrid (ES); Peter Edlund, Tumba (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,304

(22) Filed: Apr. 21, 1998

(30) Foreign Application Priority Data

Apr. 22, 1997 (SE) .............................. 9701509

(51) Int. Cl.⁷ .............................. H04L 12/64

(52) U.S. Cl. .................. 370/354; 455/466; 370/338; 340/7.27

(58) Field of Search ................ 370/395, 352, 370/280, 294, 252, 328, 354, 218, 223, 228, 230, 235, 237, 353–355, 356, 389, 431, 438, 331, 329, 337, 338, 342; 455/437, 456, 433, 466, 426, 403, 560, 556, 453, 553; 340/2.1, 2.8, 7.27; H04Q 7/22, 7/32, 7/38

(56) References Cited

U.S. PATENT DOCUMENTS 5,533,019 A * 7/1996 Jayapalan .................. 455/466
H1641 H * 4/1997 Sharman ..................... 455/466

(List continued on next page.)

FOREIGN PATENT DOCUMENTS

| WO | WO96/38992 | | 5/1996 | |
| WO | WO 97/38992 | * | 5/1996 | ............ H04Q/7/32 |
| WO | WO97/13382 | | 9/1996 | |
| WO | WO 97/13382 | * | 9/1996 | ............ H04Q/7/22 |
| WO | WO97/21314 | | 11/1996 | |
| WO | WO 97/21314 | * | 11/1996 | ............ H04Q/7/22 |

OTHER PUBLICATIONS

GSM Technical Specification, GSM 03.60, Version 1.10, Feb. 1997.*
GSM Specification, GSM 03.60, Feb. 27, 1997, version 1.1.

Primary Examiner—Seema S. Rao
(74) Attorney, Agent, or Firm—Burns, Doane, Swecker & Mathis, L.L.P.

(57) ABSTRACT

In a method of routing a short message with high or low priority from a service center to a mobile station in a public land mobile network providing both packet data service and circuit switched service, a choice is made, in advance, as to whether the short message should be received by the mobile station either via a specific one of the services or via any of the services. Based upon this choice in step, the priority of the short message sent from the service center, and an indication of whether the mobile station is reachable via one, both or none of the services, a route via one of the services, a route via both services or no route at all is selected. If a route via one of the services is selected, the short message is routed in accordance with the selected route. If a route via both services is selected, the route via the service having a higher preference than the other service is selected, and the short message is routed in accordance with the route via said service having the higher preference. If the routing of the short message to the mobile station is unsuccessful via the route via said service having the higher preference, the short message is routed in accordance with the route via the other service the lower preference.

5 Claims, 4 Drawing Sheets

U.S. PATENT DOCUMENTS 5,729,544 A * 3/1998 Lev et al. .................... 370/352
5,734,867 A * 3/1998 Clanton et al. ............. 370/458
5,878,397 A * 3/1999 Stille et al. ................. 455/466
5,978,685 A * 11/1999 Laiho ......................... 455/466
6,230,009 B1 * 5/2001 Holmes ....................... 455/426

* cited by examiner

METHOD OF ROUTING A SHORT MESSAGE AND AN APPARATUS FOR ROUTING A SHORT MESSAGE

The invention relates to a short message routing method and apparatus in a public land mobile network providing both packet data service and circuit switched service.

BACKGROUND

Short message service in general is widely known in mobile telecommunication networks. A special type of such a network, called GPRS (General Packet Radio Service), has been specified by ETSI (European Telecommunication Standardization Institute) in the GSM specification GSM 03.60, Feb. 27, 1997, Version 1.1. Both mobile terminated and mobile originated short message transfer between the various nodes in the GPRS communication system, are described in this GSM specification.

The specification does not give the network operator and/or the subscriber or end-user any flexibility in controlling how the short messages are routed through the network.

This will be described below with reference to FIGS. 1–4 on the appended drawings.

FIG. 1 schematically illustrates an embodiment of part of an existing public land mobile network providing both packet data service and circuit switched service in accordance with the invention, FIG. 2 illustrates a known successful mobile terminating transfer via packet service of a short message in the network in FIG. 1, FIG. 3 illustrates a known unsuccessful mobile terminating transfer via packet service of a short message in the network in FIG. 1, and FIG. 4 illustrates a known successful mobile originating transfer via packet service of a short message in the network in FIG. 1.

FIG. 1 schematically illustrates an embodiment of part of an existing public land mobile network providing both packet data service and circuit switched service. The illustrated network includes a home location register HLR, a mobile switching center/visitors location register MSC/VLR, a base station system BSS, a short message services gateway mobile switching center SMS-GMSC combined with a short message services inter working mobile switching center SMS-IWMSC, a short message service center SM-SC, a serving general packet radio service support node SGSN, and a gateway general packet radio service support node GGSN. In FIG. 1, a single mobile station MS is also shown.

An example of a successful short message service (SMS) to the mobile station (MS) in the network in FIG. 1, i.e. a successful mobile terminating transfer of a short message (SM), will be described with reference to FIG. 2.

In step 1, the short message service center (SM-SC) determines that it shall send a SMS to a MS and forwards the SMS to the SMS-GMSC. In step (2), the SMS-GMSC examines the address of the MS and sends a "send routing info (SRI) for SM" message to the HLR.

In step 3, the HLR returns a "SRI for SM acknowledgement" message to the SMS-GMSC. In the transfer illustrated in FIG. 2, this message is supposed to contain both the SGSN address and the MSC address of the MS assuming that the HLR has stored these addresses after previous GPRS and GSM routing area/location updating.

In accordance with this known transfer, the SMS is always sent first via GPRS.

Thus, in step (4), the SM-GMSC forwards the SMS to the SGSN.

In step (5), the SGSN transfers the SMS to the MS.

In case of a successful short message transfer to the MS, in step (6), SGSN returns a report to the SMS-GMSC indicating successful delivery of the SMS.

In step (7), the SMS-GMSC returns a report to the SM-SC indicating successful delivery of the SMS.

FIG. 3 illustrates an example of an unsuccessful SMS transfer to a MS. Steps (1)–(4) in FIG. 3 are identical to steps (1)–(4) in FIG. 2.

In step (5) in FIG. 3, however, the SGSN attempts to transfer the SMS to the MS but fails. This may occur i.e., if the MS is not attached to GPRS or when the radio channel conditions are bad.

In step (6) in FIG. 3, the SGSN sets the mobile station not reachable flag MNRF and returns a failure report to SMS-GMSC indicating unsuccessful delivery of the SMS.

In step (7) in FIG. 3, the SMS-GMSC selects the alternative, lower preference route for the short message using the MSC address received in step (3) as described in connection with FIG. 2. Thus, the SMS is forwarded to the MSC/VLR. In step (8), the MSC-VLR attempts to transfer the SMS to the MS by means of existing GSM procedures, but in this example, it is supposed that the attempt fails.

In step (9) in FIG. 3, the MSC/VLR sets the mobile station not reachable flag MNRF and returns a failure report to the SMS-GMSC indicating unsuccessful delivery of the SMS.

In step (10) in FIG. 3, the SMS-GMSC sends a "short message delivery report status" message to the HLR.

In step (11), the HLR updates its message waiting indication fields and returns a "short message delivery report status acknowledgement" message to the SMS-GMSC.

In step (12), finally, the SMS-GMSC returns a failure report to the SM-SC indicating unsuccessful delivery of the SMS.

The two transfer procedures described above in connection with FIGS. 2 and 3 do not provide any flexibility in that the SMS is always sent first via GPRS and in that the operator of the network and/or the end-user of the MS, i.e. the user of the terminating MS, is not allowed to control how the SMS should be routed through the network.

In FIG. 4, an example of a known successful SMS transfer from a MS to a SM-SC is illustrated.

In step (1) in FIG. 4, the SM is transferred from the MS to the SGSN via the BSS.

In step (2) in FIG. 4, the SGSN forwards the SMS to the SMS-IWMSC.

In step (3), the SMS is supposed to be successfully transferred to the SC.

In step (4), a report of the successful transfer is sent from the SC to the SMS-IWMSC.

In step (5), the SMS-IWMSC reports the successful transfer to the SGSN, and in step (6), the successful transfer is reported by the SGSN to the MS.

Also in mobile originating transfers of SMSs, the SMSs are always sent first over GPRS, thus, no flexibility is provided for mobile originating SMS transfer since the network operator and/or the end-user of the MS are not allowed to control how the mobile originating SMS should be routed through the network.

This means that for each mobile terminating or mobile originating SMS transfer, the GPRS will always have preference over the circuit switch (CS) service, i.e. the SMS is sent first over GPRS, and the end-user will, first, always be charged according to GPRS fares. Only if the mobile terminated SMS transfer fails with GPRS, the end-user will be charged according to the CS service fares.

As stated above, presently, the SMS will always be sent first over GPRS. As a consequence, the network operator has no way to re-route the SMS over CS in case of GPRS capacity problems, congestion problems, network problems etc. A SMS transfer has to fail over GPRS before the SMS will be sent to CS. Thus, signalling capacity will be used for nothing. Furthermore, the end-user will always be charged first according to the GPRS fares and will be charged according to the CS fares only if the SMS fails over GPRS and succeeds over CS. The operator does not offer any different charges based on the path used for the delivery of the SM.

SUMMARY

The object of the invention is, therefore, to provide flexibility to the network by enabling the operator and/or the end-user to control how the short messages are routed through the network.

This is attained by the method, according to the invention, of routing a short message with high or low priority from a service center to a mobile station in a public land mobile network providing both packet data service and circuit switched service, in that a choice is made, in advance, as to whether the short message should be received by the mobile station either via a specific one of the services or via any of the services. Based upon said choice in step, the priority of the short message sent from the service center, and an indication of whether the mobile station is reachable via one, both or none of the services, a route via one of the services, a route via both services or no route at all is selected. If a route via one of the services is selected, the short message is routed in accordance with the selected route. If a route via both services is selected, the route via the service having a higher preference than the other service is selected, and the short message is routed in accordance with the route via said service having the higher preference. If the routing of the short message to the mobile station is unsuccessful via the route via said service having the higher preference,the short message is routed in accordance with the route via said other service having lower preference.

This object is also attained by the apparatus, according to the invention, for routing a short message with high or low priority from a service center to a mobile station in a public land mobile network providing both packet data service and circuit switched service, in that means are provided to enable a choice, in advance, as to whether the short message should be received by the mobile station either via a specific one of the services or via any of the services. Means are also provided to select, on the basis of said choice, the priority of the short message sent from the service center, and an indication of whether the mobile station is reachable via one, both or none of the services, a route via one of the services, a route via both services or no route at all. Means are provided to route the short message in accordance with the selected route, if a route via one of the services is selected. Means are provided to, on the one hand, select the route via the service having a higher preference than the other service, and, on the other hand, route the short message in accordance with the route via said service having the higher preference, if a route via both services is selected. Means are provided to route the short message in accordance with the route via said other service having lower preference if the routing of the short message to the mobile station is unsuccessful via the route via the service having the higher preference.

Hereby, a flexibility for both the network operator and the end-user will be obtained.

BRIEF DESCRIPTION OF THE DRAWINGS

The invention will now be described with reference to FIGS. 5, 6, and 7 on the appended drawings.

DETAILED DESCRIPTION

Mobile terminated short message transfer

Figure 1:
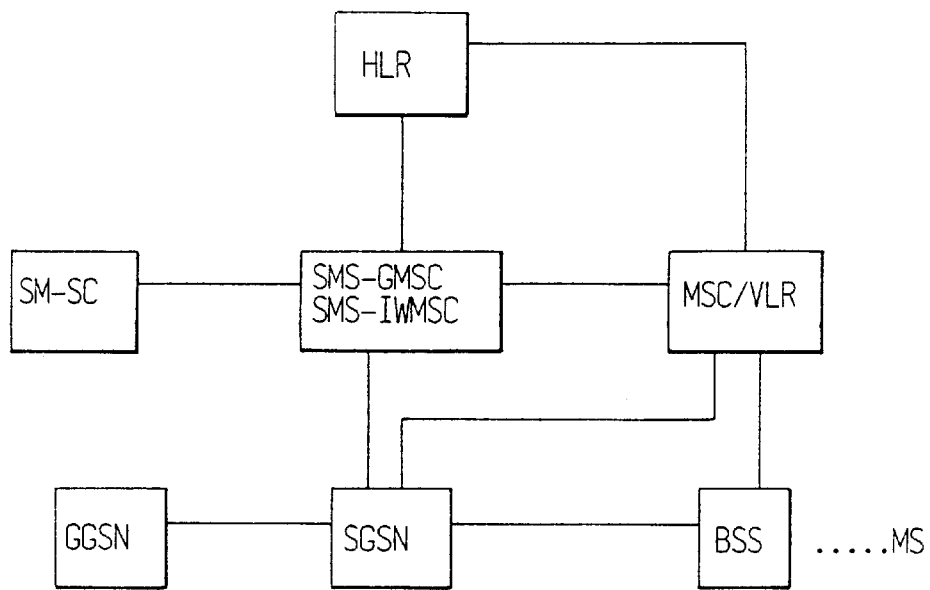
FIG. 1 illustrates an existing network.
Figure 2:
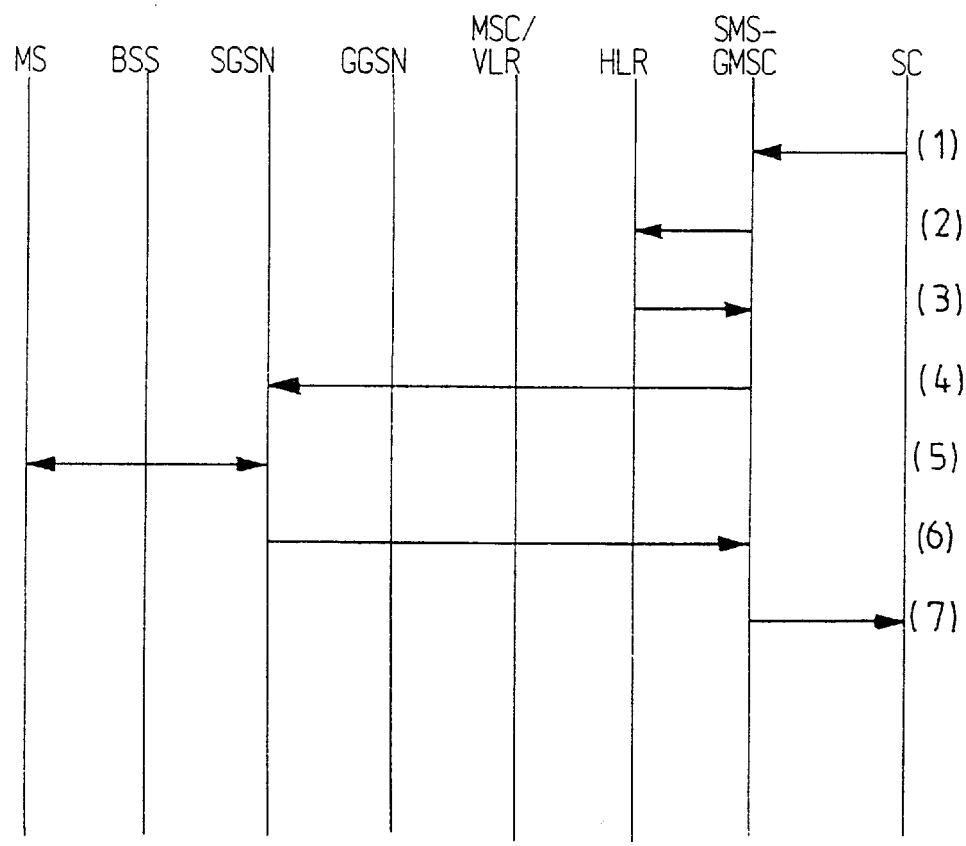
FIGS. 2–4 illustrate known mobile transfer via packet service of a short message.
Figure 3:
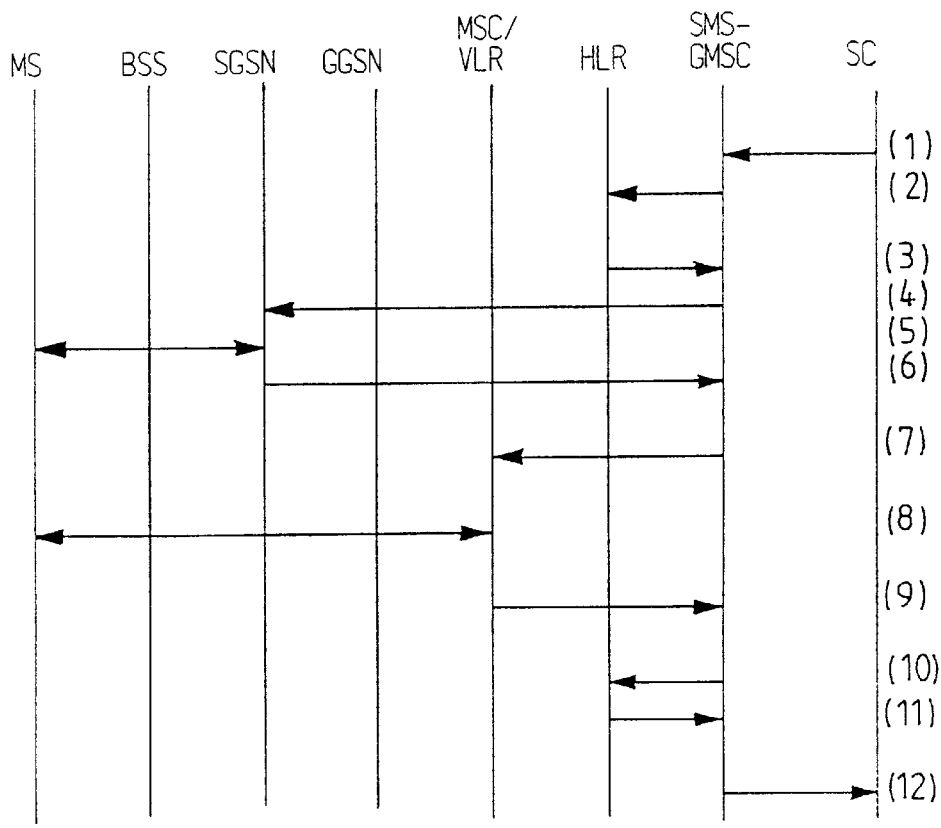
Figure 4:
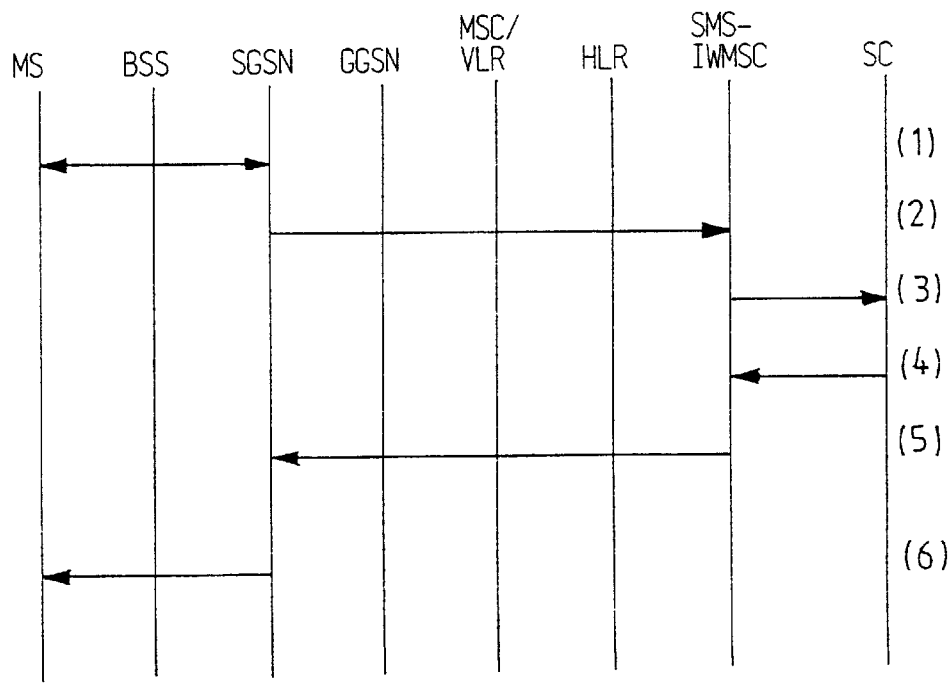

In accordance with the invention, a new category is introduced in the HLR in order to allow the route via which the SMS is to be delivered. to be chosen. This category should have the values indicated in the below Table I:

TABLE I

| VALUES | COMMENTS |
| --- | --- |
| SGSN PATH | Only SGSN address sent to SMS-GMSC |
| MSC PATH | Only MSC address sent to SMS-GMSC |
| SGSN/MSC PATH | Both SGSN and MSC address sent to SMS-GMSC |

The end-user will be able to set the SMS path category to the desired value on the MS using the same procedures as other GSM supplementary services, while the network operator will be able to set the category by command.

The setting to a specific value, i.e. SGSN and/or MSC, can be done in view of either a charging issue in that one path may be less expensive than the other or a capacity issue in that the GPRS network may be overloaded. In case the end-user does not have any preference, the SGSN/MSC value will increase the probability of a successful short message delivery.

Based on the priority of the SMS, high or low, that is set and sent by the SC, the HLR will provide to the SMS-GMSC, the node address on the basis of the below Table II:

TABLE II

| From HLR\From SC | HIGH PRIORITY | LOW PRIORITY |
| --- | --- | --- |
| SGSN PATH | SGSN address | SGSN address* |
| MSC PATH | MSC address | MSC address** |
| SGSN/MSC PATH | Both addresses | Both addresses*** |

*indicates that the SGSN address is sent only if GNRF is not set in the HLR.

TABLE II-continued

| From HLR\From SC | HIGH PRIORITY | LOW PRIORITY |
|---|---|---|

**indicates that the MSC address is sent only if MNRF is not set in the HLR.
***indicates that the SGSN address is sent only if GNRF is not set in the HLR and the MSC address is sent only if MNRF is not set in the HLR.

In case the SMS failed due to IMSI Detached or Paging failure, the MSC/VLR sets the MNRF flag and the HLR is notified by the SMS-GMSC with the cause: "Absent Subscriber" enclosing the sub-causes: "IMSI Detached" or "CS Paging failure".

As a consequence, the HLR sets the MNRF flag and also stores the sub-cause received.

If the HLR gets the information that the MS is GPRS and/or IMSI detached, or the GPRS and/or CS paging failed, two new sub-causes will be added to the cause "Absent Subscriber", namely, "GPRS Detached" or "GPRS Paging failure".

The following different cases can occur:

If only the SGSN address was sent as a result of "SRI for SM" and the SMS is rejected for GPRS, i.e. GPRS detached or GPRS paging failure, the SGSN will set the GNRF flag.

If both the MSC and the SGSN addresses were sent as "SRI for SM" result and the SMS is rejected for CS and GPRS, i.e. mixed between the four sub-causes above, the MSC/VLR will set the MNRF flag and the SGSN will set the GNRF flag.

Then, the SMS-GMSC will notify the HLR in sending SM Delivery Report Status operation with the error "Absent Subscriber" enclosing one or several of the sub-causes depending on the context.

As a consequence, the HLR will set the flag GNRF and/or the flag MNRF in accordance with the sub-causes received. These sub-causes will also be stored in the HLR.

The two flags are reset in case:

the HLR receives a notification that the MS is reachable again with "Ready For SM operation" from the MSC/VLR or the SGSN. A new originating entity parameter will be sent in this operation in order for the HLR to reset the corresponding MNRF or GNRF flag depending on the originating entity, the HLR receives the SM Delivery Report Status operation with the indication that the SM was successfully delivered for CS or GPRS.

If the SGSN and the MSC addresses were sent at "SRI for SM" and if the first attempt via one path was unsuccessful and the second attempt via the other path was successful, the SM Delivery Report Status operation:

with the error "Absent Subscriber" enclosing different sub-causes for CS or GPRS, i.e. failure in the first attempt, and with the indication that the MS is successfully delivered for CS or GPRS, will be sent from the SMS-GMSC to the HLR in order for the HLR to set/reset the corresponding MNRF and/or GNRF flag.

In accordance with the invention, a new category is introduced in the SMS-GMSC in order to allow how the SMS shall be delivered in case the SMS-GMSC receives the SGSN and the MSC addresses from the HLR. This category should have values in accordance with the below Table III:

TABLE III

| VALUES | COMMENTS |
|---|---|
| SGSN PRIORITY | Send the Short Message to the SGSN |
| MSC PRIORITY | Send the Short Message to the MSC |

Figure 5:
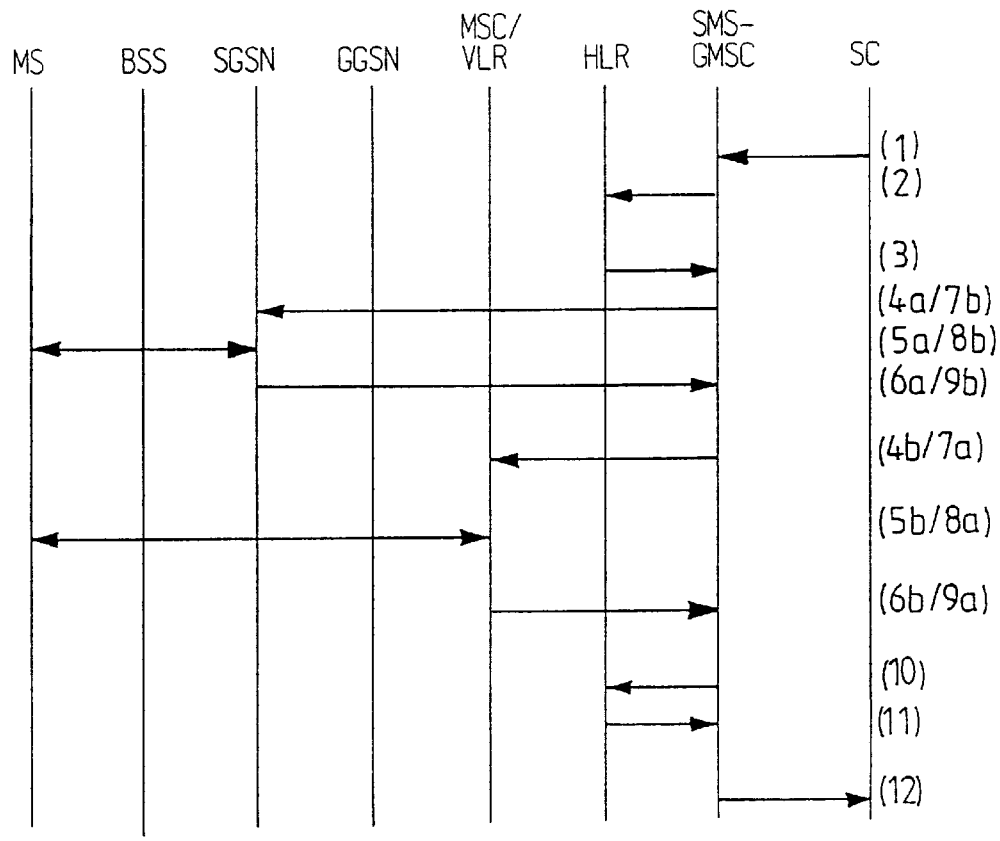
FIG. 5 illustrates a unsuccessful mobile terminating transfer of a short message in the network in FIG. 1 in accordance with the invention.

In FIG. 5, an unsuccessful mobile terminated SMS transfer via both paths, i.e. SGSN and MSC, is described in connection with the categories introduced in accordance with the invention as described above.

Step (1): Short message transfer from SM-SC to SMS-GMSC.

Step (2): "SRI for SM" sent to the HLR.

Step (3): "SRI for SM acknowledgement" received from the HLR, including both the SGSN address and the MSC address.

Based on the priority of the SM as sent by the SC and based on the SMS path category, the HLR sends, in accordance with Table II above, either the SGSN address or the MSC address or both addresses to the SMS-GMSC.

If the SMS-GMSC receives both addresses, the SMS-GMSC will check the SMS path priority category as indicated in Table III above, in order to determine whether the SM should first go through SGSN (4*a*-5*a*-6*a*) or MSC (4*b*-5*b*-6*b*). Upon receipt of a failure report, the SMS-GMSC sends the short message through the other path.

Step (4*a*/7*b*): Forward the SM to the SGSN.

Step (5*a*/8*b*): Supposed message transfer failure.

Step (6*a*/9*b*): Failure report to the SMS-GMSC.

Step (4*b*/7*a*): Forward the SM to the MSC/VLR.

Step (5*b*/8*a*): Supposed message transfer failure.

Step (6*b*/9*a*): Failure report to the SMS-GMSC.

Step (10): SM delivery report status to the HLR [reason: GPRS/IMSI detached].

Step (11): SM delivery report status acknowledgement from the HLR.

Step (12): Failure report to the SC [reason: GPRS/IMSI detached and/or GPRS/circuit switch paging failure].

Mobile originated short message transfer

In accordance with the invention, a SMS path priority category as indicated above is introduced in the MS in order to determine, on a per SMS basis, the way the SMS shall be delivered to the network. This category has the values in accordance with the below Table IV:

TABLE IV

| VALUES | COMMENTS |
|---|---|
| SGSN PRIORITY | Send the Short Message via SGSN |
| MSG PRIORITY | Send the Short Message via MSC |
| SGSN/MSC PRIORITY | Send the Short Message via MSC or SGSN |

Figure 6:
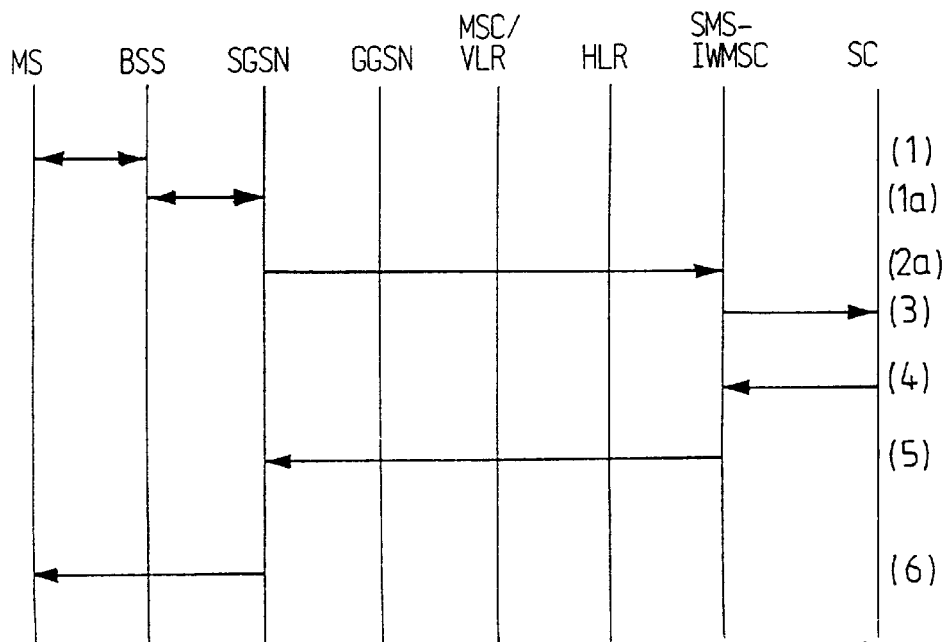
FIG. 6 illustrates a successful mobile originating transfer of a short message in the network in FIG. 1 with the mobile station preference set to one of the services provided.

With reference to FIG. 6, an example of a successful mobile originated SMS transfer will be described with the MS category set to "SGSN PRIORITY" in accordance with the above Table IV.

Step (1): Message Transfer from the MS.

The MS sends the SMS Path Priority via the radio interface to the BSS.

Step (1*a*): SM transfer to the SGSN.

Step (2*a*): Forward the SM to the SMS-IWMSC.

Step (3): SM transfer to the SC.

Step (4): Successful report from the SC to the SMS-IWMSC.

Step (5): Successful report from the SMS-IWMSC to the SGSN.

Step (6): Successful report from the SGSN to the MS.

Figure 7:
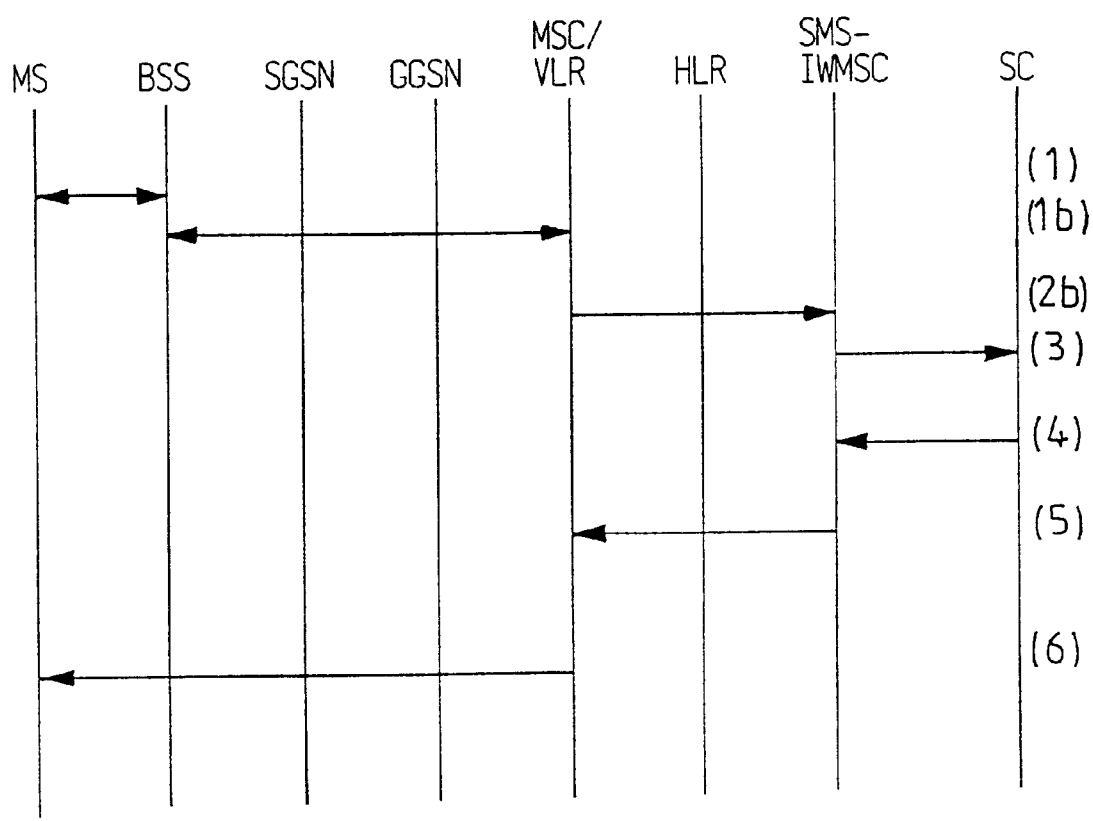
FIG. 7 illustrates a successful mobile originating transfer via circuit service of a short message in the network in FIG. 1 with the mobile station preference set to the other of the services provided.

With reference to FIG. 7, an example of a successful mobile originated SMS transfer will be described with the MS category set to "MSC PRIORITY" in accordance with the above Table IV.

Step 1: SM transfer from MS.

The MS sends the SMS Path Priority via the radio interface to the BSS.

Step (1b): SM transfer to the MSC/VLR.

Step (2b): The MSC/VLR forwards the SM to the SMS-IWMSC.

Step (3b): The SMS-IWMSC transfers the SM to the SC.

Step (4): Report of successful transfer sent from the SC to the SMS-IWMSC.

Step (5): Report of successful transfer sent from the SMS-IWMSC to the MSC/VLR.

Step (6): Report of successful transfer sent from the MSC/VLR to the MS.

The category "SGSN/MSC PRIORITY" can also be used in order for the BSS to make the decision to send the SMS either on the GPRS channel or the CS channel (e.g. channel congestion). This category enables the network to make the decision of the mode of mobile originated SMS transmission instead of the user.

The advantage attained by means of the invention is to allow the network operator and the end-user, i.e. the subscriber, to decide how SMSs shall be routed in the network. Considering the the cost for the delivery of a SMS can depend on the way it is routed, i.e. either using a circuit switched path or a packet switched path, it is important to define these scenarii for the implementation of SMS in GPRS.

Also, this flexibility makes it possible for the network operator to offer different charges on the basis of the path used for the delivery of the short message.

As should be apparent from the above, a greater flexibility is obtained in accordance with the invention.

This flexibility will allow the operator to handle the network resources in a more efficient way.

What is claimed is:

1. A method of routing a short message with high or low priority from a service center to a mobile station in a public land mobile network providing both packet data service and circuit switched service, comprising the steps of:

a) making a choice, in advance, as to whether the short message should be received by the mobile station either via a specific one of packet data service or circuit switched service, or by either packet data service or circuit switched service;

b) based upon said choice in step a), the priority of the short message sent from the service center, and an indication of whether the mobile station is reachable via one, both or neither the packet data or circuit switched services, selecting a route via one of the services, a route via both services, or no route all, c) if a route via one of the services is selected in step b), routing the short message in accordance with the selected route, d) if a route via both services is selected in step b), selecting the route via the service having a higher preference that the other service, and routing the short message in accordance with the route via said service having the higher performance, e) if the routing of the short message to the mobile station is unsuccessful via the route via said service having the higher preference, as selected in step d), routing the short message in accordance with the route via said other service having lower preference.

2. The method as claimed in claim 1, further comprising selecting, in advance, which one of the services should have the higher preference.

3. The method as claimed in claim 1, comprising making said choice on a per short message basis.

4. An apparatus for routing a short message with high or low priority from a service center to a mobile station in a public land mobile network providing both packet data service and circuit switched service, comprising means adapted to enable a choice, in advance, as to whether the short message service should be received by the mobile station either via specific one of packet data service or circuit switched, or by either packet data service or circuit switched service;

means adapted to select, on the basis of said choice, the priority of the short message sent from the service center, and an indication of whether the mobile station is reachable via one, both or neither the packet data or circuit switched services, a route via one of the services, a route via both services, or no route all, means adapted to route the short message in accordance with the selected route, if a route via one of the services is selected, means adapted, on the one hand, to select the route via the service having a higher preference than the other service, and, on the other hand, to route the short message in accordance with the route via said service having the higher preference, if a route via both services is selected, means adapted to route the short message in accordance with the route via said other service having lower preference if the routing of the short message to the mobile station is unsuccessful via the route via the service having the higher preference.

5. The apparatus as claimed in claim 4, further comprising means adapted to enable, in advance, the selection of which one of the services should have the higher preference.

* * * * *